United States Patent
Kase et al.

(10) Patent No.: US 9,880,363 B2
(45) Date of Patent: Jan. 30, 2018

(54) METHOD OF MANUFACTURING OPTICAL DEVICE INCLUDING RESIN LAYER

(71) Applicant: FUJITSU LIMITED, Kawasaki-shi, Kanagawa (JP)

(72) Inventors: Mariko Kase, Isehara (JP); Takashi Shiraishi, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/613,585

(22) Filed: Jun. 5, 2017

(65) Prior Publication Data

US 2017/0269310 A1  Sep. 21, 2017

Related U.S. Application Data

(62) Division of application No. 14/333,962, filed on Jul. 17, 2014, now Pat. No. 9,703,052.

(30) Foreign Application Priority Data

Sep. 13, 2013  (JP) ................................. 2013-191022

(51) Int. Cl.
G02B 6/42 (2006.01)

(52) U.S. Cl.
CPC .......... *G02B 6/4206* (2013.01); *G02B 6/4232* (2013.01); *G02B 6/4257* (2013.01)

(58) Field of Classification Search
CPC .. G02B 6/4206; G02B 6/4212; G02B 6/4232; G02B 6/4257; G02B 6/4214; H01L 31/02161; H01L 27/14618; H01L 2224/05099; H01L 2224/05005; H01L 2224/0501

See application file for complete search history.

(56) References Cited

U.S. PATENT DOCUMENTS

| | | | |
|---|---|---|---|
| 5,411,430 A | 5/1995 | Nishimura | |
| 5,748,822 A * | 5/1998 | Miura | G02B 6/3803 385/49 |
| 6,297,911 B1 | 10/2001 | Nishikawa et al. | |
| 7,157,743 B2 * | 1/2007 | Kaneko | H01S 5/18388 257/79 |
| 7,583,867 B2 | 9/2009 | Terada et al. | |
| 7,630,594 B2 | 12/2009 | Lee et al. | |
| 7,792,398 B2 | 9/2010 | Tanaka et al. | |

(Continued)

FOREIGN PATENT DOCUMENTS

| | | |
|---|---|---|
| CN | 102257313 | 11/2011 |
| JP | 1-178443 | 7/1989 |

(Continued)

OTHER PUBLICATIONS

Office Action dated Mar. 23, 2016 in U.S. Appl. No. 14/333,962.

(Continued)

*Primary Examiner* — Akm Enayet Ullah
(74) *Attorney, Agent, or Firm* — Staas & Halsey LLP

(57) ABSTRACT

An optical device includes: an optical element with a surface including one of a light-receiving portion and a light-emitting portion; a resin layer provided over the one of light-receiving portion and the light-emitting portion; and a resin lens provided over the resin layer, wherein the resin layer includes a first shape larger than a second shape of the resin lens in a direction parallel to the surface.

8 Claims, 13 Drawing Sheets

(56) References Cited

U.S. PATENT DOCUMENTS

| | | | |
|---|---|---|---|
| 8,536,512 B2 | 9/2013 | Shiraishi | |
| 8,774,576 B2 | 7/2014 | Shiraishi | |
| 9,316,799 B2 | 4/2016 | Shiraishi | |
| 2004/0160676 A1* | 8/2004 | Kaneko | H01L 31/02161 359/642 |
| 2004/0165835 A1* | 8/2004 | Kaneko | G02B 6/4206 385/88 |
| 2005/0002106 A1* | 1/2005 | Hasei | B29D 11/00365 359/620 |
| 2006/0262410 A1 | 11/2006 | Toyoda | |
| 2007/0273977 A1* | 11/2007 | Nemoto | C08J 7/18 359/664 |
| 2009/0324171 A1 | 12/2009 | Yasuda et al. | |
| 2010/0133419 A1* | 6/2010 | Suetake | H01L 27/14618 250/208.1 |
| 2011/0242435 A1 | 10/2011 | Mouri | |
| 2012/0008899 A1 | 1/2012 | Morioka | |
| 2012/0076454 A1* | 3/2012 | Shiraishi | G02B 6/42 385/14 |
| 2012/0236416 A1* | 9/2012 | Sugahara | G02B 3/005 359/619 |
| 2014/0140657 A1 | 5/2014 | Shiraishi | |

FOREIGN PATENT DOCUMENTS

| | | |
|---|---|---|
| JP | 2000-75106 | 3/2000 |
| JP | 2000-180605 | 6/2000 |
| JP | 2002-57372 | 2/2002 |
| JP | 2004-119583 | 4/2004 |
| JP | 2004-272016 | 9/2004 |
| JP | 2006-150751 | 6/2006 |
| JP | 2006-264253 | 10/2006 |
| JP | 2006-323147 | 11/2006 |
| JP | 2007-80926 | 3/2007 |
| JP | 2012-068539 | 4/2012 |
| JP | 2012-108326 | 6/2012 |
| WO | 2012-067761 | 5/2012 |

OTHER PUBLICATIONS

Office Action dated Aug. 29, 2016 in U.S. Appl. No. 14/333,962.
Office Action dated Dec. 14, 2016 in U.S. Appl. No. 14/333,962.
Notice of Allowance dated Apr. 18, 2017 in U.S. Appl. No. 14/333,962.
Japanese Office Action dated Jan. 31, 2017 in corresponding Japanese Patent Application No. 2013-191022.
Chinese Office Action dated Feb. 6, 2015 in Chinese Application No. 201310460470.1.
Office Action dated Sep. 11, 2015 in U.S. Appl. No. 14/016,603.
Notice of Allowance dated Jan. 6, 2016 in U.S. Appl. No. 14/016,603.
Restriction Requirement dated Jan. 21, 2016 in U.S. Appl. No. 14/333,962.
U.S. Appl. No. 14/333,962, filed Jul. 17, 2014, Mariko Kase.
Extended European Search Report dated Nov. 17, 2017 from European Patent Application No. 13184938.2, 7 pages.

* cited by examiner

METHOD OF MANUFACTURING OPTICAL DEVICE INCLUDING RESIN LAYER

CROSS-REFERENCE TO RELATED APPLICATION

This application is a divisional application of U.S. application Ser. No. 14/333,962 filed on Jul. 17, 2014 which is based upon and claims the benefit of priority of the prior Japanese Patent Application No. 2013-191022, filed on Sep. 13, 2013, the entire contents of which are incorporated herein by reference.

FIELD

Embodiments discussed herein are related to an optical device, an optical module, and a method of manufacturing the optical device.

BACKGROUND

An optical element that serves as a light-receiving element and a light-emitting element used for optical communications is optically coupled to an optical fiber or the like, which is an optical transmission medium. The optical coupling between the optical element and the optical fiber is performed using a lens.

Related art is disclosed in Japanese Laid-open Patent Publication Nos. 2000-180605, 1-178443, 2006-150751, 2006-323147, 2006-264253, or 2000-75106.

SUMMARY

According to one aspect of the embodiments, an optical device includes: an optical element with a surface including one of a light-receiving portion and a light-emitting portion; a resin layer provided over the one of light-receiving portion and the light-emitting portion; and a resin lens provided over the resin layer, wherein the resin layer includes a first shape larger than a second shape of the resin lens in a direction parallel to the surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, a resin microlens is formed on a light-receiving portion or a light-emitting portion of an optical element, and the optical element and an optical fiber are optically coupled using the microlens. There may be a plurality of methods for forming a microlens on a substrate.

For example, since high-speed operations are enabled by reducing the light-reception diameter of a light-receiving element, the light-reception diameter and the light-emission diameter of an optical element are made minute. In an optical device in which a resin lens is formed on a light-receiving portion or a light-emitting portion, since the resin lens decreases in size as the light-reception diameter and the light-emission diameter are made smaller, the adhesion of the resin lens may be reduced. For example, when the optical device is mounted over a wiring board by flip-chip mounting, bumps are heated to a high temperature or ultrasonic vibrations act on the bumps. The high temperature or the ultrasonic waves may put a load on the resin lens, and if the resin lens does not have sufficient adhesion, the resin lens may separate from the optical element.

Figure 1:
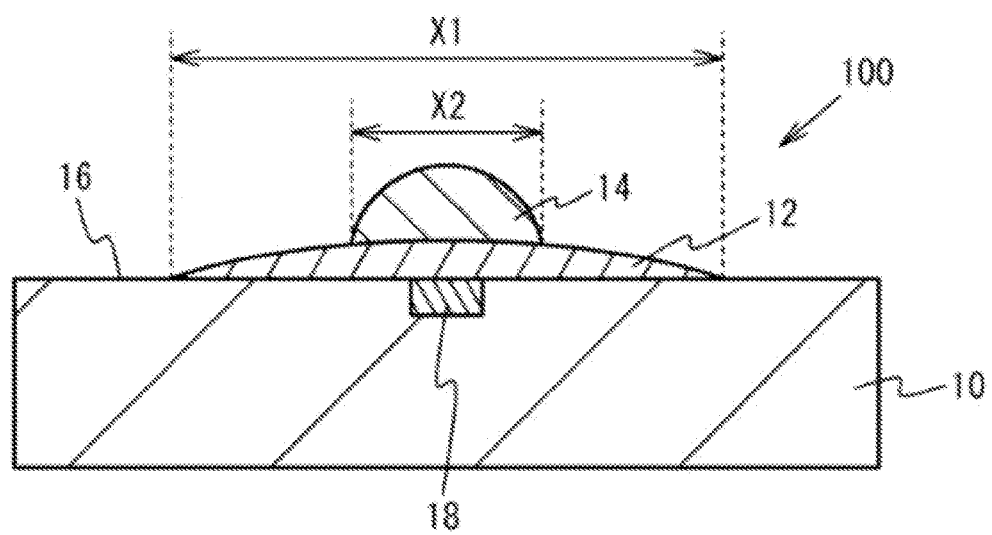
FIG. 1 illustrates an example of a cross-sectional view of an optical device.

FIG. 1 illustrates an example of a cross-sectional view of an optical device. As illustrated in FIG. 1, an optical device 100 includes a light-receiving element 10, a resin layer 12, and a resin lens 14. The light-receiving element 10 may be a light-receiving element utilized for optical communications using a wavelength band of, for example, 850 nm, and includes a main surface 16 provided with a light-receiving portion 18, which absorbs light having a wavelength in the band of 850 nm. In the light-receiving element 10, for example, a gallium arsenide (GaAs) layer is provided on a GaAs substrate as a light-absorbing layer. The width (the light-reception diameter) of the light-receiving portion 18 may be small for high-speed operations. For example, the light-reception diameter may be smaller than the core diameter of a multimode optical fiber, which is, for example, 50 µm, and may be approximately 30 µm.

The resin layer 12 is provided on the light-receiving portion 18 and is in contact with the light-receiving element 10 over an area larger than the area of an upper surface of the light-receiving portion 18. For example, the resin layer 12 is provided so as to cover all the upper surface of the light-receiving portion 18. For example, the width of the light-receiving portion 18 may be approximately 30 µm, and a width X1 of the resin layer 12 may be approximately 200 µm. The thickness of the thickest portion of the resin layer 12 may be, for example, in a range from 5 µm to 25 µm. For example, the resin layer 12 may have a round shape or another shape.

The resin lens 14 is provided on the resin layer 12, and may have a shape smaller than the shape of the resin layer 12 in the direction parallel to the main surface 16. For example, a width X2 of the resin lens 14 may be approximately 50 µm. For example, the resin lens 14 may have a spherical shape and the radius of curvature of the resin lens 14 may be approximately 25 µm. The resin lens 14 may have a shape that is not spherical. The resin layer 12 may be formed of resin with viscosity that is lower than the viscosity of the resin lens 14.

Light emitted from the multimode optical fiber is collected through the resin lens 14 and enters the light-receiving portion 18. Thus, the resin layer 12 and the resin lens 14 may be transparent to the light emitted from the multimode optical fiber, for example, light with a wavelength in the band of 850 nm. The light emitted from the multimode optical fiber passes through the resin layer 12, and the resin layer 12 may not substantially have a function as a lens.

Figure 2A:
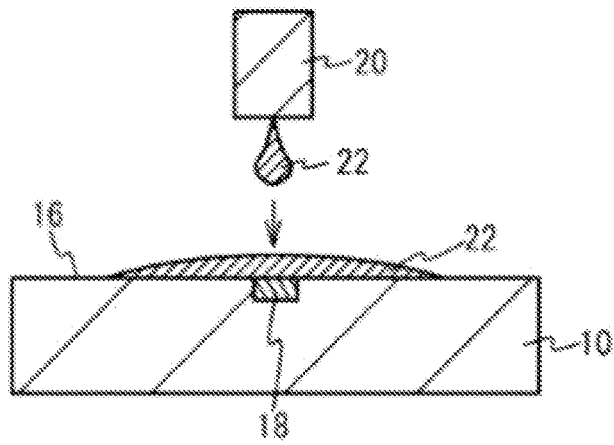
FIGS. 2A to 2D illustrate an example of a method of manufacturing an optical device.

FIGS. 2A to 2D illustrate an example of a method of manufacturing an optical device. In FIGS. 2A to 2D, cross-sectional views of the optical device 100 in FIG. 1 are illustrated. As illustrated in FIG. 2A, first resin 22 is applied using an ink jet head 20 onto the light-receiving portion 18 formed over the main surface 16 of the light-receiving element 10. For example, ultraviolet (UV)-curable resin with relatively low viscosity of approximately 5 mPa may be used as the first resin 22. Since the viscosity of the first resin 22 is relatively low, the first resin 22 may spread widely outward from the upper surface of the light-receiving portion 18 to be formed.

Figure 2B:
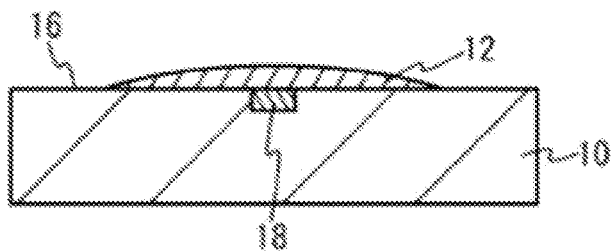

As illustrated in FIG. 2B, the first resin 22 is exposed to UV radiation and cured. As a result, the resin layer 12 that is in contact with the light-receiving element 10 over an area larger than the area of the upper surface of the light-receiving portion 18 is formed on the light-receiving portion 18.

Figure 2C:
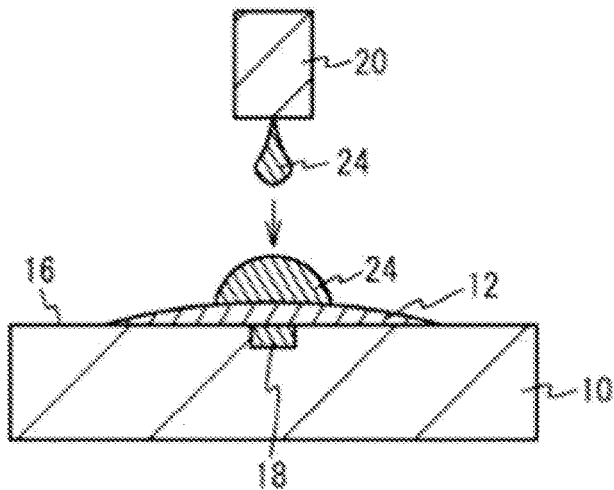

As illustrated in FIG. 2C, second resin 24 is applied onto the resin layer 12 using the ink jet head 20. For example, UV-curable resin with viscosity of approximately 20 mPa, which is higher than the viscosity of the first resin 22, may be used as the second resin 24. Since the viscosity of the second resin 24 is higher than the viscosity of the first resin 22, the second resin 24 does not spread as widely as the first resin 22 and may have a lens-like shape. Thus, resin with viscosity that brings a desirable lens-like shape may be used as the second resin 24.

Figure 2D:
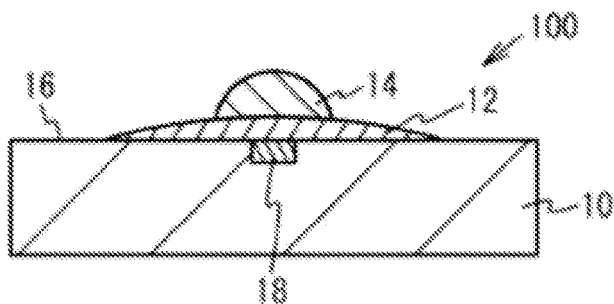

As illustrated in FIG. 2D, the second resin 24 is exposed to UV radiation and cured. As a result, the resin lens 14 that has a shape smaller than the shape of the resin layer 12 in the direction parallel to the main surface 16 of the light-receiving element 10 is formed on the resin layer 12. The optical device 100 in FIG. 1 may be formed by a method including the processes described above.

Figure 3:
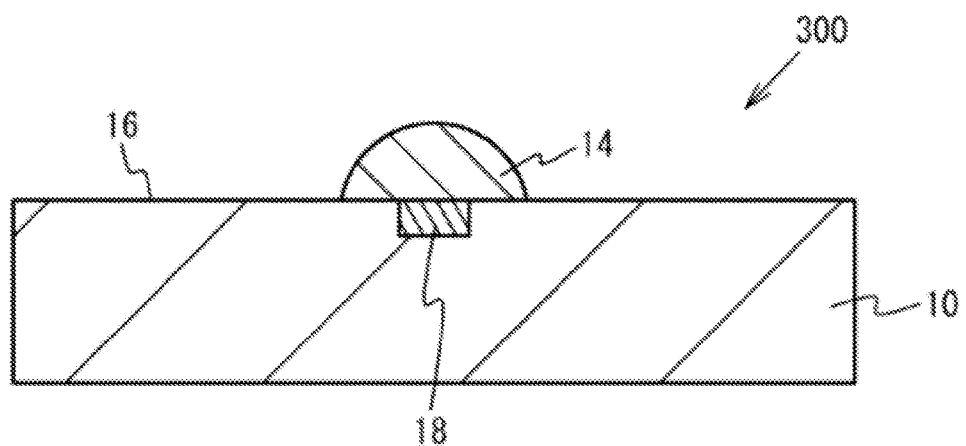
FIG. 3 illustrates an example of a cross-sectional view of an optical device.

FIG. 3 illustrates an example of a cross-sectional view of an optical device. As illustrated in FIG. 3, in an optical device 300, the resin layer 12 is not provided on the light-receiving portion 18 and the resin lens 14 is formed so as to be directly in contact with the light-receiving element 10. The rest of the configuration may be substantially the same or similar to the configuration of the optical device 100 in FIG. 1, and the explanation thereof may be omitted or reduced.

The resin lens 14 is formed so as to be directly in contact with the light-receiving element 10. When the width (the light-reception diameter) of the light-receiving portion 18 is decreased for high-speed operations, the diameter of the resin lens 14 is decreased as well. Thus, in the configuration illustrated in FIG. 3, the area of the portion in which the resin lens 14 and the light-receiving element 10 are in contact with each other is small. Since the light-receiving element 10 is formed of a semiconductor, the resin lens 14 may fail to obtain sufficient adhesion. As a result, the resin lens 14 may separate from the light-receiving element 10 because of, for example, the temperature or the ultrasonic waves caused in mounting the optical device 300 illustrated in FIG. 3 over a wiring board by flip-chip mounting.

For example, in FIG. 1, the resin layer 12 that has a shape larger than the shape of the resin lens 14 in the direction parallel to the main surface 16 is formed on the light-receiving portion 18, and the resin lens 14 is provided on the resin layer 12. Since the resin layer 12 has a shape larger than the shape of the resin lens 14 in the direction parallel to the main surface 16, the area of the portion in which the resin lens 14 and the light-receiving element 10 are in contact with each other is large and the adhesion between the resin lens 14 and the light-receiving element 10 is increased. Since the resin lens 14 is provided on the resin layer 12 by inter-resin bonding, the adhesion between the resin lens 14 and the resin layer 12 is high. Thus, the adhesion of the resin lens 14 illustrated in FIG. 1 may be enhanced. For example, even when the light-reception diameter of the light-receiving portion 18 is small for high-speed operations, the resin lens 14 with sufficient adhesion may be obtained.

In the optical device 100 in FIG. 1, as illustrated in FIGS. 2A to 2D, the first resin 22 is applied onto the light-receiving portion 18 to form the resin layer 12, and the second resin 24 is applied onto the resin layer 12 to form the resin lens 14. The first resin 22 may be applied so that the resin layer 12 may have a shape larger than the shape of the resin lens 14 in the direction parallel to the main surface 16 and, in order to be structured as described above, the viscosity of the first resin 22 may be lower than the viscosity of the second resin 24. For example, the viscosity of the resin of the resin layer 12 may be lower than the viscosity of the resin of the resin lens 14. The resin layer 12 formed by applying the first resin 22 with low viscosity is in contact with the light-receiving element 10 over a large area and has a small layer thickness. Accordingly, the adhesion between the resin layer 12 and the light-receiving element 10 may be increased.

The light-receiving element 10 may be a light-receiving element utilized for optical communications that uses the wavelength band of 850 nm or may be a light-receiving element used in another wavelength band. For example, the light-receiving element 10 may be a light-receiving element used in a wavelength band of 1.3 µm. For example, the light-receiving element for the wavelength band of 1.3 µm may have a configuration in which, for example, an indium aluminum gallium arsenide (InAlGaAs) layer is provided on an indium phosphide (InP) substrate as a light-absorbing layer. Since the InP substrate is transparent to light in the wavelength band of 1.3 µm, the InP substrate may have a configuration in which lenses are integrated by shaping a lower surface of the InP substrate into a lens. For example, the light-receiving element for the wavelength band of 850 nm may have a configuration in which a GaAs layer is provided on a GaAs substrate as a light-absorbing layer. When a lower surface of the GaAs substrate has a lens-like shape, light in the wavelength band of 850 nm is absorbed by the GaAs substrate and as a result, the light-receiving element for the wavelength band of 850 nm may lose a function as a light-receiving element. Thus, since a technique of shaping a lower surface of a substrate into a lens is not employed for the light-receiving element for the wavelength band of 850 nm, the techniques described above may be applicable. This may apply to a light-receiving element in which a substrate and a light-absorbing layer are formed of the same semiconductor material.

The first resin 22 illustrated in FIG. 2A may be applied only once or for a plurality of times. When the first resin 22 is applied for a plurality of times, the resin layer 12 is made thick and as a result, the height of the resin lens 14 may be obtained.

Figure 4:
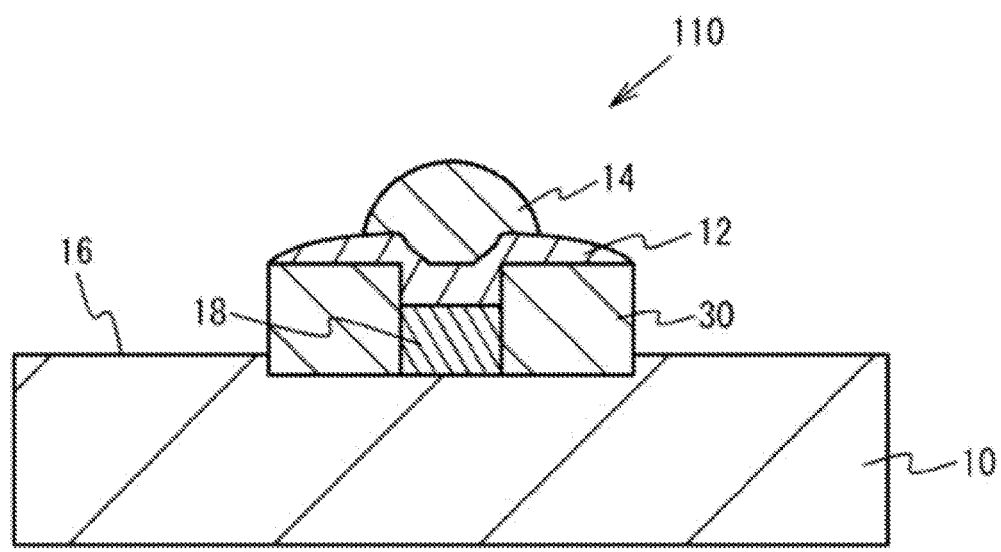
FIG. 4 illustrates an example of a cross-sectional view of an optical device.

FIG. 4 illustrates an example of a cross-sectional view of an optical device. As illustrated in FIG. 4, an optical device 110 in FIG. 4 has a shape like a mesa in which the light-receiving portion 18 projects from the main surface 16 of the light-receiving element 10, and is provided with an electrode 30 that surrounds the light-receiving portion 18 and is in contact with the light-receiving portion 18. For example, the electrode 30 is a cathode electrode of the light-receiving element 10. The electrode 30 may have a shape that projects more than the light-receiving portion 18. The resin layer 12 is provided so as to extend from the upper surface of the light-receiving portion 18 to an upper surface of the electrode 30, and the shape of the resin layer 12 may be defined by the electrode 30. The resin layer 12 has a shape that includes a depression above the light-receiving portion 18. The resin lens 14 is formed on the depression. The rest of the configuration may be substantially the same as or similar to the configuration illustrated in FIG. 1, and the explanation thereof may be omitted or reduced.

Figure 5A:
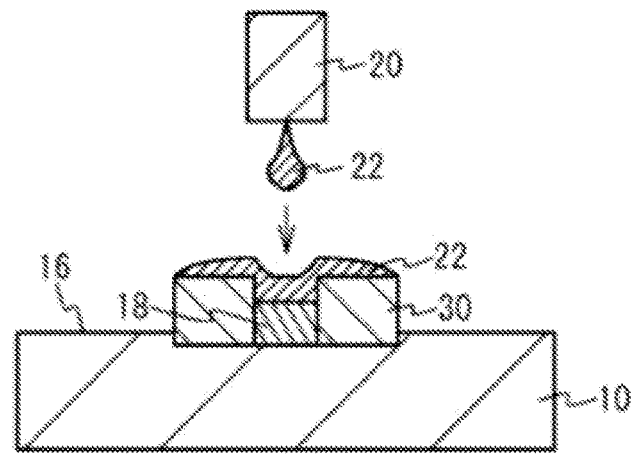
FIGS. 5A to 5D illustrate an example of a method of manufacturing an optical device.

FIGS. 5A to 5D illustrate an example of a method of manufacturing an optical device. In FIGS. 5A to 5D, cross-sectional views of the optical device 110 in FIG. 4 are illustrated. As illustrated in FIG. 5A, the first resin 22 is applied using the ink jet head 20 onto the light-receiving portion 18 around which the electrode 30 projecting more than the light-receiving portion 18 is formed so as to be in contact with the light-receiving portion 18. For example, UV-curable resin with relatively low viscosity may be used as the first resin 22. Although the first resin 22 spreads and extends from the upper surface of the light-receiving portion 18 to the upper surface of the electrode 30 because of the relatively low viscosity, the surface tension avoids the first resin 22 from spreading toward outside from the electrode 30 and the electrode 30 defines the shape of the first resin 22. Since the electrode 30 has a shape that projects more than the light-receiving portion 18, the first resin 22 may have a shape that includes a depression above the light-receiving portion 18.

Figure 5B:
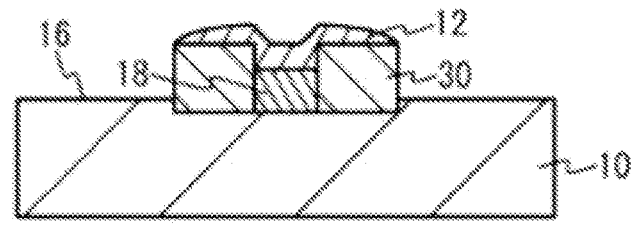

As illustrated in FIG. 5B, the first resin 22 is exposed to UV radiation and cured. Thus, the resin layer 12 that is provided so as to extend from the upper surface of the light-receiving portion 18 to the upper surface of the electrode 30, has a shape defined by the electrode 30 and includes a depression above the light-receiving portion 18 is formed.

Figure 5C:
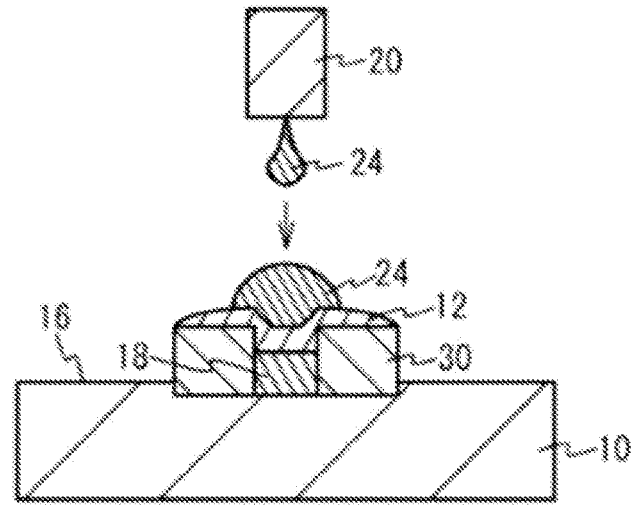

As illustrated in FIG. 5C, the second resin 24 is applied onto the resin layer 12 using the ink jet head 20. For example, UV-curable resin with relatively high viscosity may be used as the second resin 24. Since the viscosity of the second resin 24 is higher than the viscosity of the first resin 22, the second resin 24 is shaped like a lens without spreading like the first resin 22, and since the resin layer 12 has a shape that includes a depression above the light-receiving portion 18, the second resin 24 is formed on the depression.

Figure 5D:
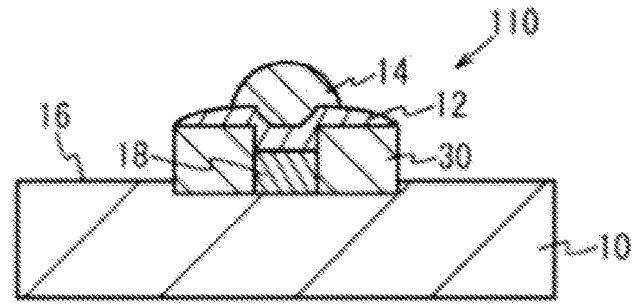

As illustrated in FIG. 5D, the second resin 24 is exposed to UV radiation and cured. Thus, the resin lens 14 that has a shape smaller than the shape of the resin layer 12 in the direction parallel to the main surface 16 of the light-receiving element 10 is formed on the resin layer 12. The optical device 110 in FIG. 4 is formed by a method including the processes described above.

As illustrated in FIG. 4, the light-receiving element 10 includes the electrode 30 that projects more than the light-receiving portion 18 around the light-receiving portion 18 and is in contact with the light-receiving portion 18. The resin layer 12 is provided so as to extend from the upper surface of the light-receiving portion 18 to the upper surface of the electrode 30, and the shape of the resin layer 12 is defined by the electrode 30. The configuration is obtained by applying the first resin 22 onto the light-receiving portion 18 around which the electrode 30 projecting more than the light-receiving portion 18 is formed so as to be in contact with the light-receiving portion 18 as illustrated in FIGS. 5A and 5B. For example, when the position at which the first resin 22 is applied is shifted from the center of the light-receiving portion 18, the center of the resin layer 12 may be easily matched the center of the light-receiving portion 18. Part of the resin layer 12 above the light-receiving portion 18 is depressed and the resin lens 14 is formed on the depression. Thus, the center of the resin lens 14 may be easily matched the center of the light-receiving portion 18.

The projecting portion that is provided around the light-receiving portion 18 so as to be in contact with the light-receiving portion 18 and projects more than the light-receiving portion 18 may be the electrode 30. For example, the projecting portion may be a protection film that protects the light-receiving element 10.

Figure 6A:
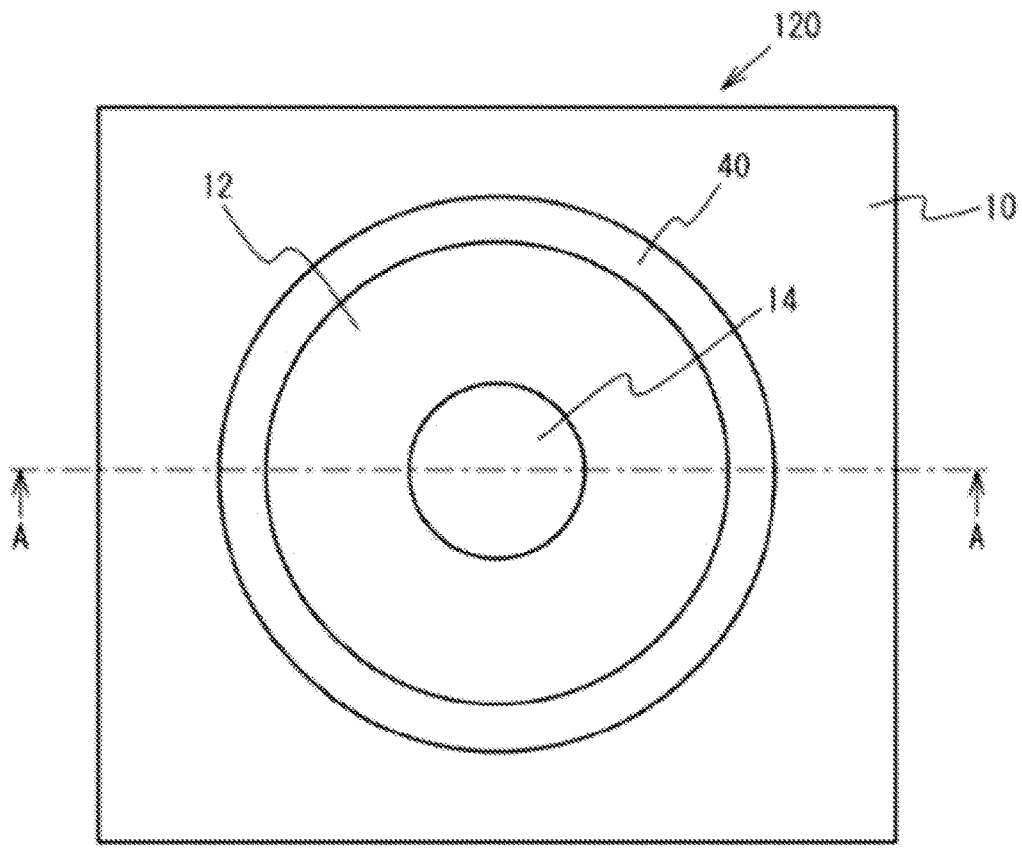
FIG. 6A illustrates an example of a top view of an optical device.
Figure 6B:
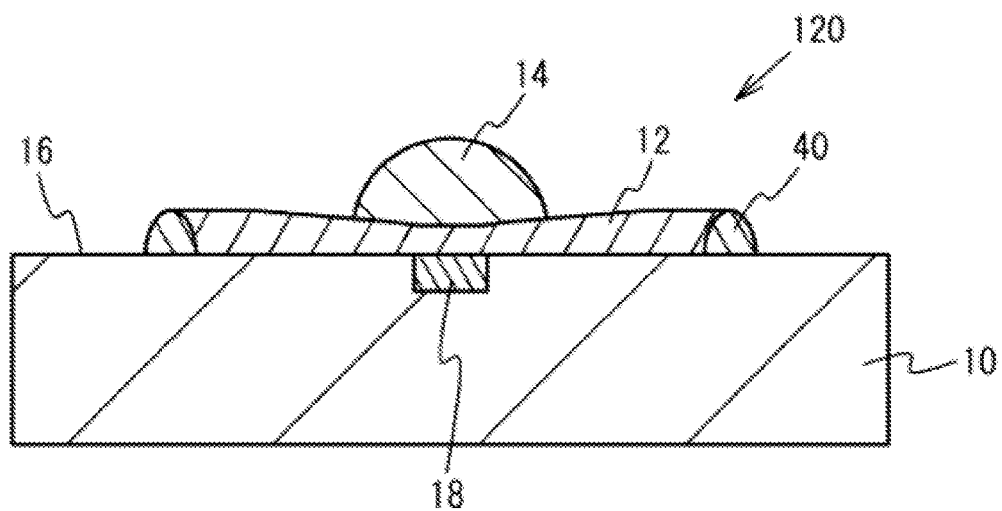
FIG. 6B illustrates an example of a cross-sectional view of an optical device.

FIG. 6A illustrates an example of a top view of an optical device. FIG. 6B illustrates an example of a cross-sectional view of an optical device. In FIG. 6B, the cross-sectional view taken along line A-A in FIG. 6A is illustrated. As illustrated in FIGS. 6A and 6B, in an optical device 120, a projecting portion 40 is provided on the main surface 16 of the light-receiving element 10 so as to be separate from the light-receiving portion 18 and surround the light-receiving portion 18. For example, the projecting portion 40 may contain resin with viscosity higher than the viscosity of the resin layer 12, and the resin may be substantially the same as the resin contained in the resin lens 14. The projecting portion 40 may be formed of a material other than resin. Although the projecting portion 40 is shaped like a ring as illustrated in FIG. 6A, the projecting portion 40 may have another shape, such as a rectangular shape. The inside diameter of the projecting portion 40 may be, for example, approximately 200 μm and the thickness of the thickest portion of the projecting portion 40 may be, for example, in a range from 5 μm to 25 μm. The resin layer 12 is provided so as to cover the inside portion surrounded by the projecting portion 40, and the shape of the resin layer 12 is defined by the projecting portion 40. The resin layer 12 has a shape that is depressed in a central portion, for example, above the light-receiving portion 18, because of the tension caused by the projecting portion 40. The resin lens 14 may be formed on the depression. The rest of the configuration illustrated in FIGS. 6A and 6B may be substantially the same as or similar to the configuration illustrated in FIG. 1, and the explanation thereof may be omitted or reduced.

Figure 7A:
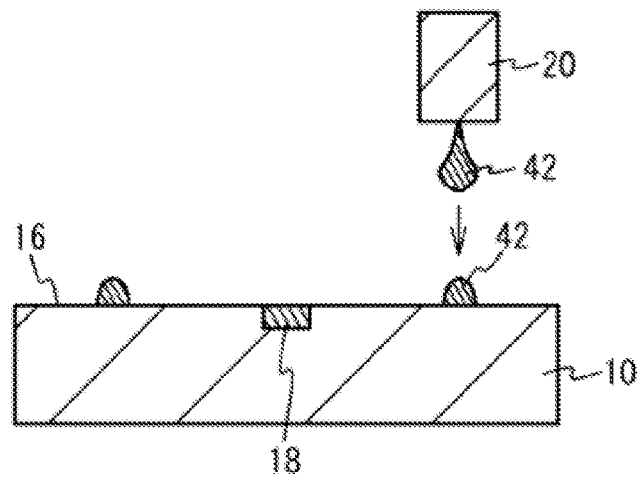
FIGS. 7A to 7D illustrate an example of a method of manufacturing an optical device.

FIGS. 7A to 7D, 8A, and 8B illustrate an example of a method of manufacturing an optical device. In FIGS. 7A to 7D, 8A, and 8B, cross-sectional views of the optical device 120 in FIGS. 6A and 6B are illustrated. As illustrated in FIG. 7A, third resin 42 is applied using the ink jet head 20 onto the main surface 16 of the light-receiving element 10, which is provided with the light-receiving portion 18, so as to be separate from the light-receiving portion 18 and surround the light-receiving portion 18. For example, UV-curable resin with viscosity higher than the viscosity of the first resin 22 illustrated in FIG. 1 may be used as the third resin 42. For example, the resin used as the third resin 42 may be substantially the same as the second resin 24 illustrated in FIG. 1.

Figure 7B:
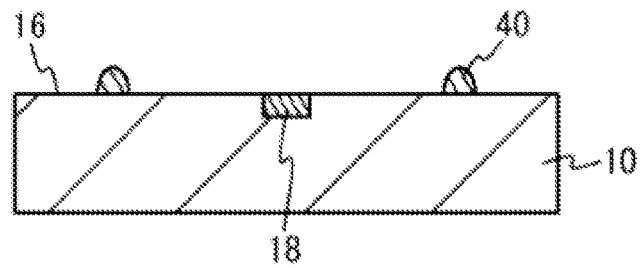

As illustrated in FIG. 7B, the third resin 42 is exposed to UV radiation and cured. Thus, the projecting portion 40 is formed on the main surface 16 of the light-receiving element 10 so as to be separate from the light-receiving portion 18 and surround the light-receiving portion 18.

Figure 7C:
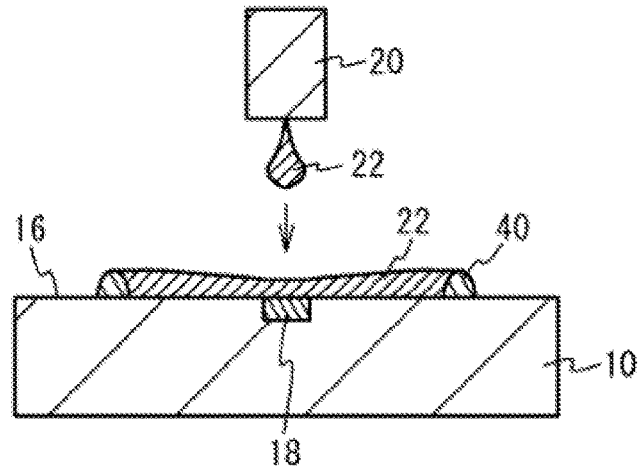

As illustrated in FIG. 7C, the first resin 22 is applied onto the light-receiving portion 18 using the ink jet head 20. For example, UV-curable resin with relatively low viscosity may be used as the first resin 22. When the first resin 22 spreads outward from the upper surface of the light-receiving portion 18 because of the relatively low viscosity and is formed, the spread may be stopped by the projecting portion 40.

Figure 7D:
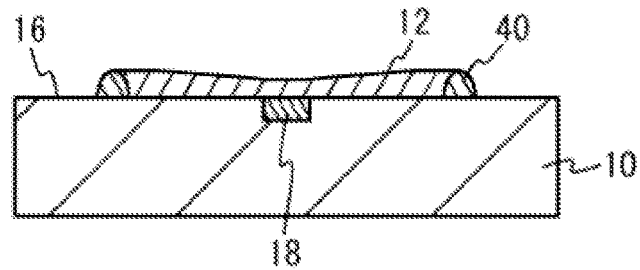

As illustrated in FIG. 7D, the first resin 22 is exposed to UV radiation and cured. Thus, the resin layer 12 that covers the inside portion of the projecting portion 40 and has a shape defined by the projecting portion 40 is formed. The resin layer 12 has a shape that includes a depression in the central portion, for example, above the light-receiving portion 18, because of the tension caused by the projecting portion 40.

Figure 8A:
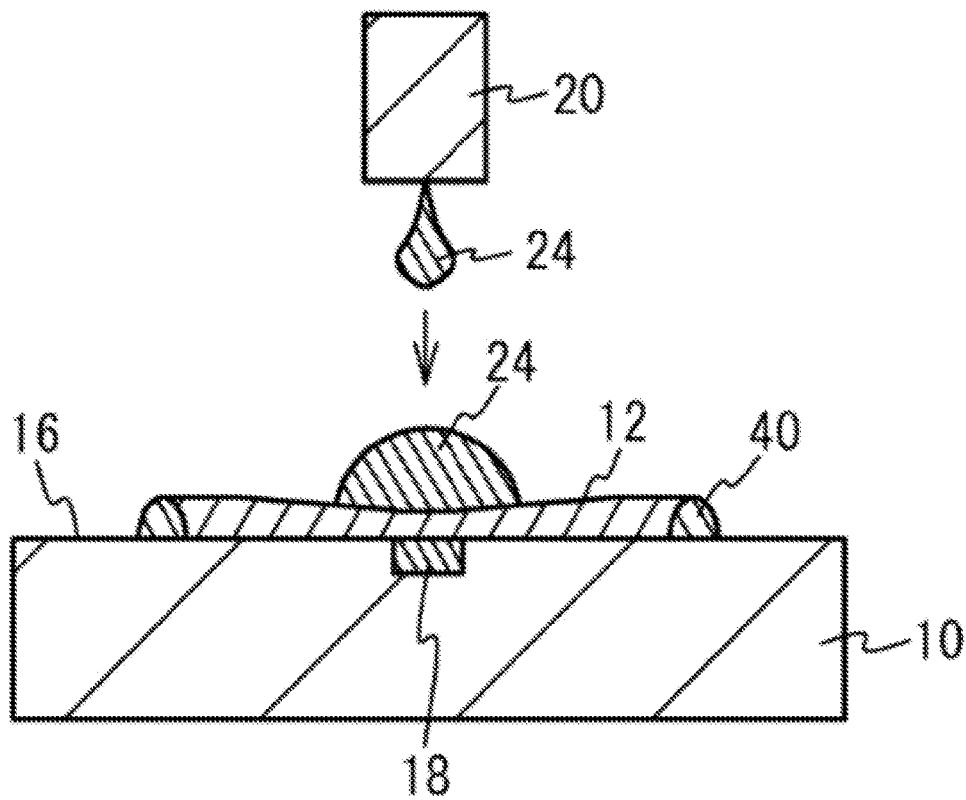
FIGS. 8A and 8B illustrate an example of a method of manufacturing an optical device.

As illustrated in FIG. 8A, the second resin 24 is applied onto the resin layer 12 using the ink jet head 20. For example, the second resin 24 may be UV-curable resin with relatively high viscosity. Since the viscosity of the second resin 24 is higher than the viscosity of the first resin 22, the second resin 24 is shaped like a lens without spreading like the first resin 22. Further, since the central portion of the resin layer 12 is depressed, the second resin 24 is formed on the depression.

Figure 8B:
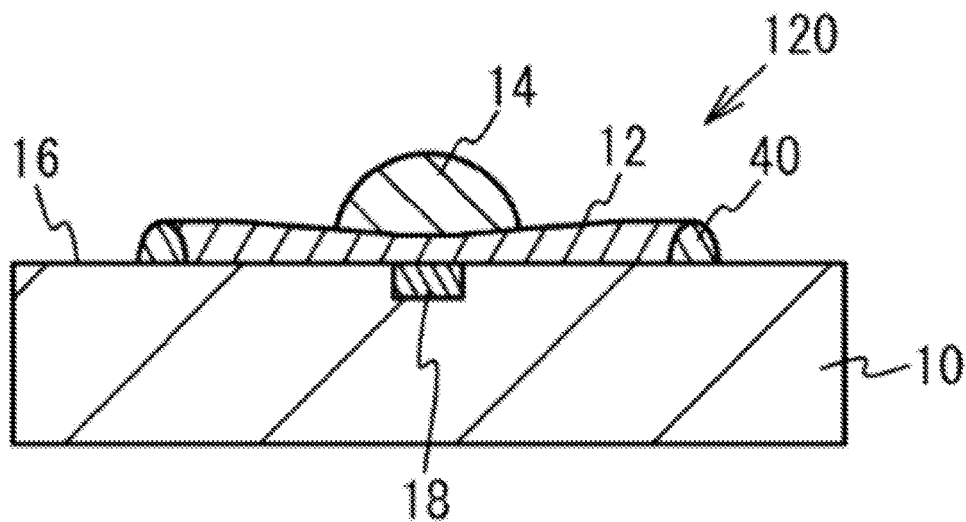

As illustrated in FIG. 8B, the second resin 24 is exposed to UV radiation and cured. Thus, the resin lens 14 that has a shape smaller than the shape of the resin layer 12 in the direction parallel to the main surface 16 of the light-receiving element 10 is formed on the resin layer 12. The optical device 120 illustrated in FIGS. 6A and 6B is formed by a method including the processes described above.

As illustrated in FIGS. 6A and 6B, the light-receiving element 10 includes the projecting portion 40 that surrounds the light-receiving portion 18 so as to be separate from the light-receiving portion 18 and projects more than the main surface 16. The resin layer 12 is provided so as to cover the inside portion of the projecting portion 40, and the shape of the resin layer 12 is defined by the projecting portion 40. The configuration may be obtained as illustrated in FIGS. 7A to 7D by forming the projecting portion 40 that surrounds the light-receiving portion 18 so as to be separate from the light-receiving portion 18 and projects more than the main surface 16 and then applying the first resin 22 onto the light-receiving portion 18. Since the shape of the resin layer 12 is defined by the projecting portion 40, the degree of flexibility in manufacturing the resin layer 12 may increase. Even when the position at which the first resin 22 is applied is shifted from the center of the light-receiving portion 18, the center of the resin layer 12 may be easily matched the center of the light-receiving portion 18. Since the central portion of the resin layer 12 is depressed because of the tension caused by the projecting portion 40, the resin lens 14 is formed on the depression and the center of the resin lens 14 may be easily matched the center of the light-receiving portion 18.

Figure 9:
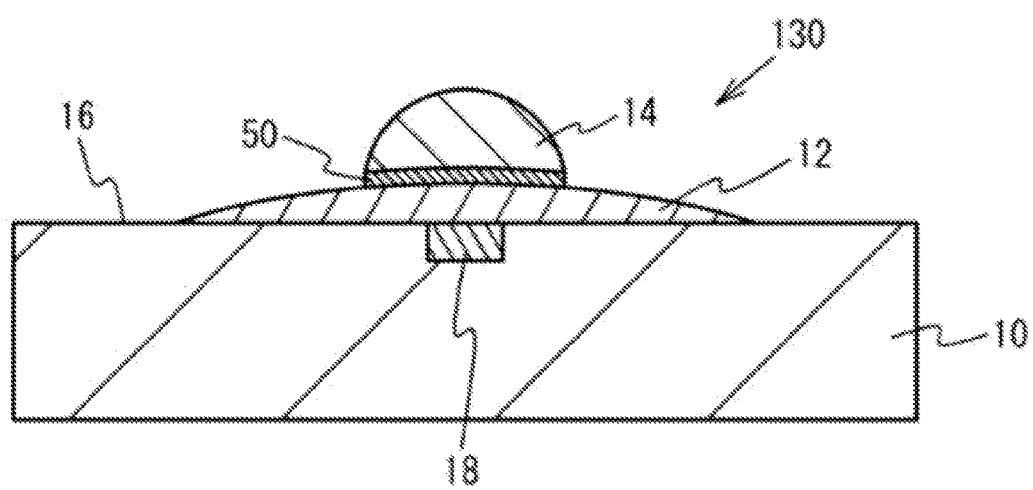
FIG. 9 illustrates an example of a cross-sectional view of an optical device.

FIG. 9 illustrates an example of a cross-sectional view of an optical device. In an optical device 130 illustrated in FIG. 9, a water-repellent film 50 is provided between the resin layer 12 and the resin lens 14. The water-repellent film 50 includes a film with water-repellent properties higher than the water-repellent properties of the resin layer 12 and the main surface 16 of the light-receiving element 10, and may contain, for example, fluorine resin. For example, the resin lens 14 may contain resin substantially the same as or similar to the resin contained in the resin layer 12. Since the rest of the configuration is substantially the same as or similar to the configuration illustrated in FIG. 1, the explanation thereof may be omitted or reduced.

Figure 10A:
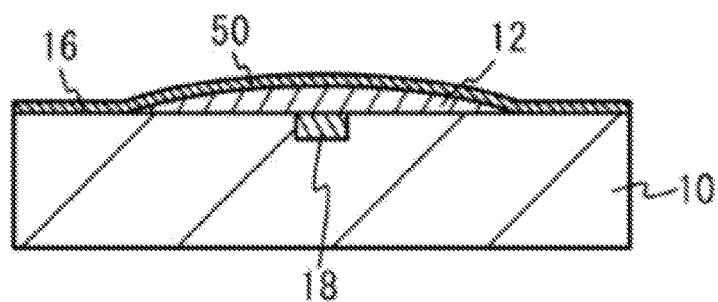
FIGS. 10A to 10C illustrate an example of a method of manufacturing an optical device.
Figure 10B:
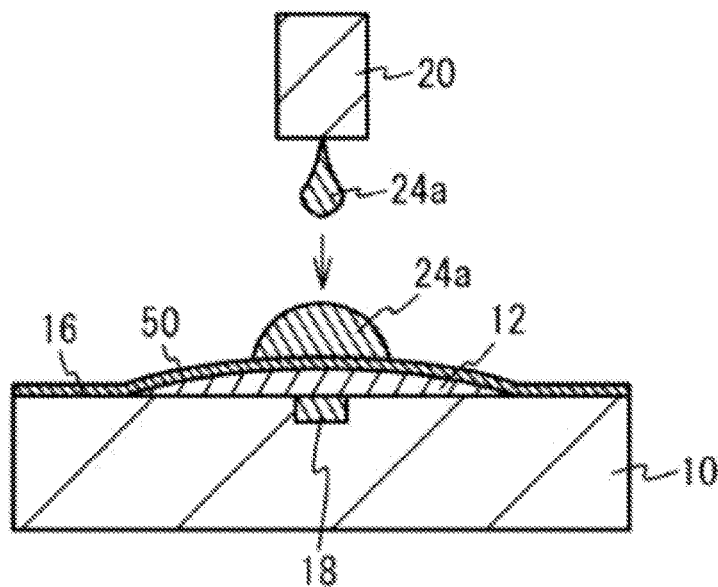
Figure 10C:
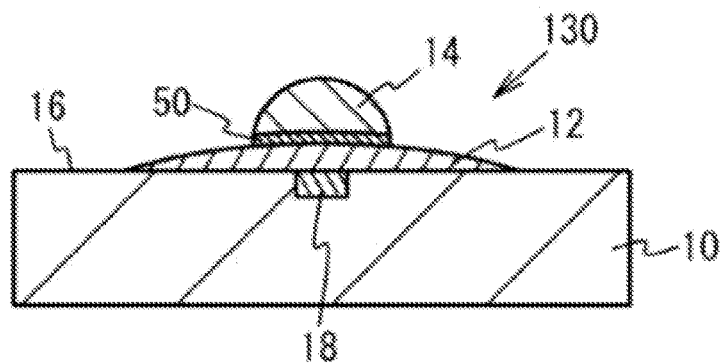

FIGS. 10A to 10C illustrate an example of a method of manufacturing of an optical device. In FIGS. 10A to 10C, cross-sectional views of the optical device 130 in FIG. 9 are illustrated. For example, the processes in FIGS. 2A and 2B are performed. After that, as illustrated in FIG. 10A, the water-repellent film 50 is formed so as to cover a surface of the resin layer 12. The water-repellent film 50 may be formed by applying and drying the water-repellent film 50.

As illustrated in FIG. 10B, second resin 24a is applied onto the resin layer 12 using the ink jet head 20. For example, unlike the second resin 24 illustrated in FIG. 1, the second resin 24a may contain UV-curable resin with relatively low viscosity. For example, the second resin 24a may contain resin substantially the same as or similar to the first resin 22 contained in the resin layer 12. Since the water-repellent film 50 is provided on the resin layer 12 and the wettability is decreased, the second resin 24a is shaped like a lens without spreading widely even when the second resin 24a with relatively low viscosity is applied.

As illustrated in FIG. 10C, the second resin 24a is exposed to UV radiation and cured. Thus, the resin lens 14 that has a shape smaller than the shape of the resin layer 12 in the direction parallel to the main surface 16 of the light-receiving element 10 is formed on the resin layer 12. The water-repellent film 50 other than the part between the resin layer 12 and the resin lens 14 is removed by wet etching. The optical device 130 illustrated in FIG. 9 is formed by a method including the processes described above.

As illustrated in FIG. 9, the water-repellent film 50 is provided between the resin layer 12 and the resin lens 14 and formed before the formation of the resin lens 14 so as to cover the surface of the resin layer 12 as illustrated in FIG. 10A. Since the water-repellent film 50 is provided, the second resin 24a contained in the resin lens 14 may be resin with relatively low viscosity. For example, resin substantially the same as or similar to the first resin 22 contained in the resin layer 12 may be used. The resin layer 12 and the resin lens 14 are formed using one kind of resin with substantially the same viscosity. Since the resin layer 12 and the resin lens 14 contain substantially the same resin, the adhesion between the resin layer 12 and the resin lens 14 may be enhanced.

Figure 11A:
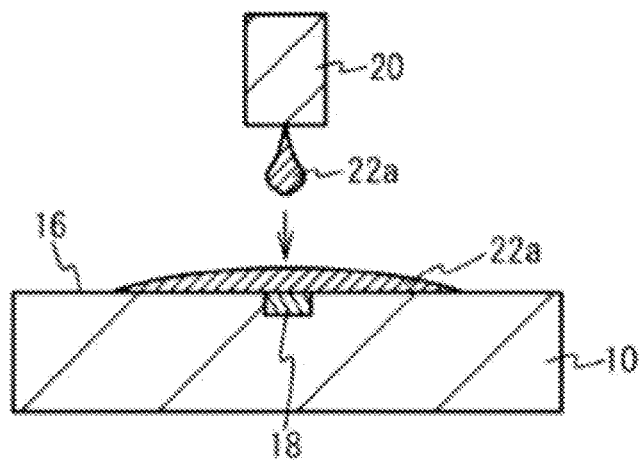
FIGS. 11A to 11D illustrate an example of a method of manufacturing an optical device.

FIGS. 11A to 11D illustrate an example of a method of manufacturing an optical device. As illustrated in FIG. 11A, plasma treatment is performed on the main surface 16 of the light-receiving element 10 and the main surface 16 is roughened. After that, first resin 22a is applied onto the light-receiving portion 18 using the ink jet head 20. For example, unlike the first resin 22 illustrated in FIG. 1, UV-curable resin with relatively high viscosity may be used as the first resin 22a. For example, the resin used as the first resin 22a may be substantially the same as the second resin 24a contained in the resin lens 14. Since the main surface 16 of the light-receiving element 10 is roughened, even when the first resin 22a with relatively high viscosity is applied, the first resin 22a spreads widely outward from the upper surface of the light-receiving portion 18 to be formed.

Figure 11B:
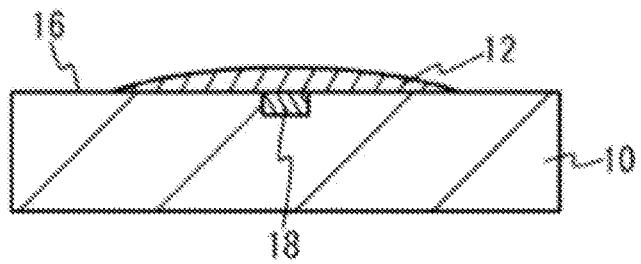

As illustrated in FIG. 11B, the first resin 22a is exposed to UV radiation and cured. Thus, the resin layer 12 is formed on the light-receiving portion 18 so as to be in contact with the light-receiving element 10 over an area larger than the area of the upper surface of the light-receiving portion 18.

Figure 11C:
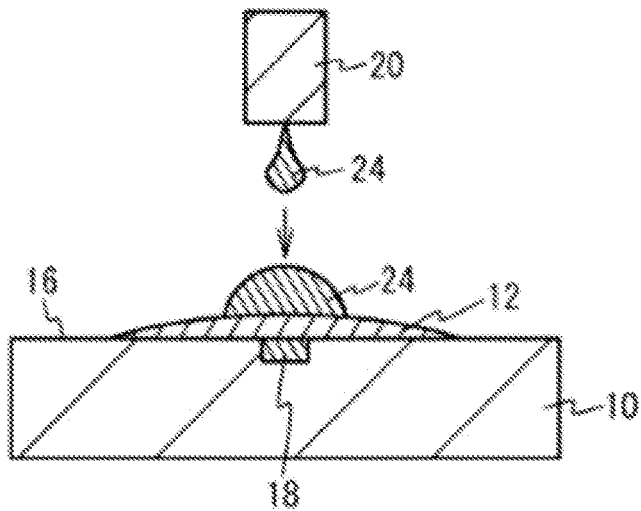

As illustrated in FIG. 11C, the second resin 24 is applied onto the resin layer 12 using the ink jet head 20. For example, resin with relatively high viscosity may be used as the second resin 24. Since the viscosity of the second resin 24 is relatively high, the second resin 24 is shaped like a lens without spreading widely.

Figure 11D:
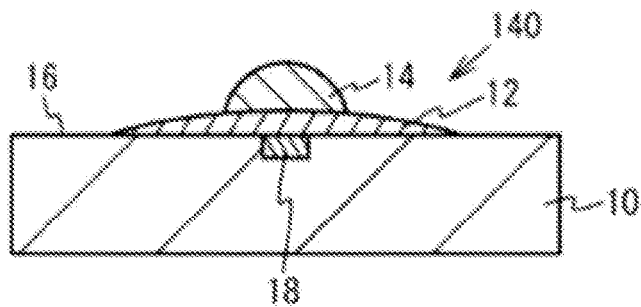

As illustrated in FIG. 11D, the second resin 24 is exposed to UV radiation and cured. Thus, the resin lens 14 that has a shape smaller than the shape of the resin layer 12 in the direction parallel to the main surface 16 of the light-receiving element 10 is formed on the resin layer 12. An optical device 140 is formed by a method including the processes described above.

The plasma treatment is performed on the main surface 16 of the light-receiving element 10 before forming the resin layer 12. Since the main surface 16 is roughened, resin with relatively high viscosity is used as the first resin 22a used for the formation of the resin layer 12. For example, resin substantially the same as or similar to the second resin 24 contained in the resin lens 14 is used. The resin layer 12 and the resin lens 14 are formed of one kind of resin with substantially the same viscosity, and the adhesion between the resin layer 12 and the resin lens 14 may be enhanced.

The techniques described above may be applied to an optical device provided with the light-receiving element 10 that includes the light-receiving portion 18 as an optical element or may be applied to an optical device provided with a light-emitting element that includes a light-emitting portion. For example, a vertical cavity surface emitting laser (VCSEL) may be used as the light-emitting element and a resin layer may be provided on the light-emitting portion. The optical element may be an optical semiconductor element in which a semiconductor layer is formed on a substrate or may have another configuration.

The resin layer 12 and the resin lens 14 may be formed by applying the first resin 22 and 22a, and the second resin 24 and 24a by an ink jet technique, or may be formed by another technique. The resin layer 12 and the resin lens 14 may contain UV-curable resin. For example, the first resin 22 and 22a, and the second resin 24 and 24a may contain UV-curable resin. The resin layer 12 and the resin lens 14 may contain thermosetting resin. The third resin 42 contained in the projecting portion 40 illustrated in FIGS. 6A and 6B may be UV-curable resin or may be thermosetting resin.

Figure 12:
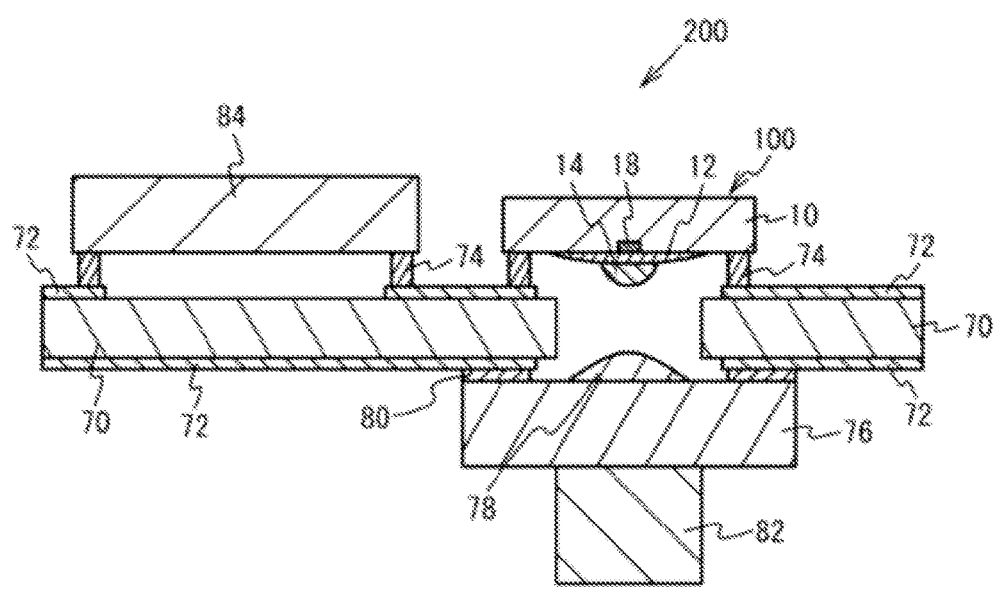
FIG. 12 illustrates an example of a cross-sectional view of an optical module.

FIG. 12 illustrates an example of a cross-sectional view of an optical module. An optical module 200 illustrated in FIG. 12 may include the optical device 100 illustrated in FIG. 1. In the optical module 200 illustrated in FIG. 12, the optical device 100 illustrated in FIG. 1 is mounted over pads 72 formed on an upper surface of a wiring board 70 through bumps 74 by flip-chip mounting. The method of mounting the optical device 100 may include face-up mounting, which uses a wire, and flip-chip mounting, which reduces impedance components of the wire. A lens film 76 provided with a lens 78 is bonded through a bonding layer 80 to the pads 72 on a lower surface of the wiring board 70 at a position corresponding to the optical device 100. A multimode optical fiber 82 is coupled to the lens film 76. An optical signal emitted from the multimode optical fiber 82 is collected into the light-receiving portion 18 of the light-receiving element 10 through the lens 78 and the resin lens 14 of the optical device 100.

Further, a transimpedance amplifier (TIA) 84 is mounted over the upper surface of the wiring board 70. The TIA 84 is also mounted over the pads 72 formed on the upper surface of the wiring board 70 through the bumps 74 by flip-chip mounting. The TIA 84 is an integrated circuit (IC), which performs impedance conversion on a current signal output from the optical device 100, amplifies the signal, and outputs the signal as a voltage signal.

In the optical module 200 illustrated in FIG. 12, the optical device 100 illustrated in FIG. 1 is mounted over the wiring board 70 by flip-chip mounting. In mounting the optical device 100 over the wiring board 70 by flip-chip mounting, the bumps 74 are heated to a high temperature or ultrasonic vibrations act on the bumps 74. The adhesion is enhanced in the resin lens 14 of the optical device 100. Even when the load caused by the high temperature or the ultrasonic waves during the flip-chip mounting acts on the resin lens 14, the possibility of separation of the resin lens 14 from the light-receiving element 10 may be reduced.

Figure 13:
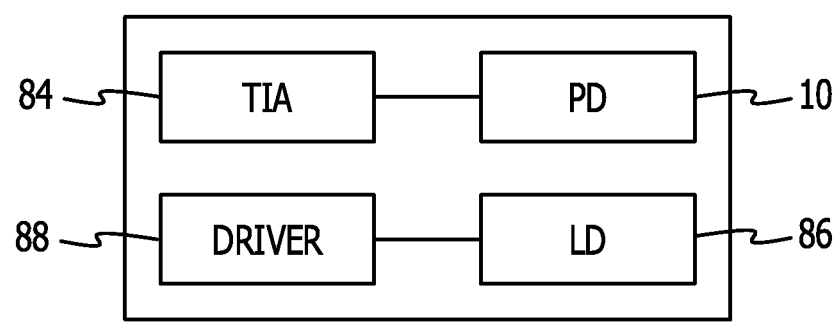
FIG. 13 illustrates an example of an optical transceiver.

The optical module 200 may include the optical device 100 illustrated in FIG. 1 or may include the optical device illustrated in FIGS. 4, 6A and 6B, 9, or 11A to 11D, and substantially similar advantages may be obtained. In FIG. 12, an optical engine module that includes the light-receiving element 10 and the TIA 84 is illustrated. FIG. 13 illustrates an example of an optical transceiver. In FIG. 13, an optical transceiver module that includes a light-emitting element 86 and a driver 88 in addition to the light-receiving element 10 and the TIA 84 is illustrated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of manufacturing an optical device, the method comprising:
   forming a resin layer by applying first resin onto one of a light-receiving portion and a light-emitting portion which is provided on a surface of an optical element;
   forming a resin lens by applying second resin onto the resin layer; and
   forming a projecting portion that projects more than the surface so as to surround the one of the light-receiving portion and the light-emitting portion, and be separate from the one of the light-receiving portion and the light-emitting portion,
   wherein the first resin is applied so that the resin layer has a shape larger than a shape of the resin lens in a direction parallel to the surface.

2. The method according to claim 1, wherein the first resin and the second resin are applied by an ink jet technique so as to form the resin layer and the resin lens respectively.

3. The method according to claim 1,
   wherein the projecting portion projects more than the one of the light-receiving portion and the light-emitting portion, further comprising:

applying the first resin onto the one of the light-receiving portion and the light-emitting portion which is provided with the projecting portion.

4. The method according to claim 1, wherein the projecting portion is formed by applying third resin with a viscosity higher than a viscosity of the first resin, onto the surface.

5. The method according to claim 1, wherein the first resin has a viscosity lower than a viscosity of the second resin.

6. The method according to claim 1, further comprising:
forming a water-repellent film that covers a surface of the resin layer.

7. The method according to claim 1, further comprising:
performing plasma treatment on the surface of the optical element.

8. The method according to claim 6, wherein the first resin and the second resin contain substantially the same resin.

\* \* \* \* \*